United States Patent
Sahoo et al.

(10) Patent No.: US 10,613,834 B2
(45) Date of Patent: Apr. 7, 2020

(54) SYSTEMS AND METHOD FOR SUPPORTING REACTIVE RESPONSES USING A DEPENDENCY INJECTION FRAMEWORK

(71) Applicant: Oracle International Corporation, Redwood Shores, CA (US)

(72) Inventors: Sanjeeb Kumar Sahoo, Santa Clara, CA (US); Mahesh Kannan, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 306 days.

(21) Appl. No.: 15/433,661

(22) Filed: Feb. 15, 2017

(65) Prior Publication Data

US 2018/0081644 A1    Mar. 22, 2018

Related U.S. Application Data

(60) Provisional application No. 62/396,154, filed on Sep. 17, 2016.

(51) Int. Cl.
 *G06F 8/20*    (2018.01)
 *G06F 9/448*   (2018.01)

(52) U.S. Cl.
 CPC .............. *G06F 8/20* (2013.01); *G06F 9/4488* (2018.02)

(58) Field of Classification Search
 CPC ................................. G06F 8/20; G06F 9/4488
 USPC ...................................................... 717/110
 See application file for complete search history.

(56) References Cited

U.S. PATENT DOCUMENTS

| 7,421,702 B1* | 9/2008 | Margulis | G06F 9/465 719/313 |
| 2002/0198833 A1* | 12/2002 | Wohlstadter | G06Q 40/04 705/40 |
| 2008/0295119 A1* | 11/2008 | Muscarella | G06F 9/465 719/330 |
| 2009/0300591 A1* | 12/2009 | Duffy | G06F 9/52 717/149 |

(Continued)

OTHER PUBLICATIONS

Dave Syer, "Notes on Reactive Programming Part 1: The Reactive Landscape", 9 pages retrieved on Jun. 7, 2016 from: https://spring.io/blog/2016/06/07/notes-on-reactive-programming-part-i-the-reactive-landscape>.

*Primary Examiner* — Todd Aguilera
*Assistant Examiner* — Sen Thong Chen
(74) *Attorney, Agent, or Firm* — Tucker Ellis LLP

(57) ABSTRACT

In accordance with an embodiment, described herein is a system and method for supporting a reactive response using a dependency injection (DI) framework. The DI framework can determine the dependencies of a response object, and invoke a plurality of services for retrieving dependency objects from backend systems to satisfy those dependencies. Each service can return a reactive object, which the DI framework can match to a dependency object, thereby enabling the DI framework to orchestrate asynchronous concurrent calls to the services on behalf of an application. Each reactive object can be used to retrieve a corresponding dependency object at a later time. The DI framework can use the dependency object to compose the response object and inject the response object to an application at the server environment.

20 Claims, 5 Drawing Sheets

(56) References Cited

U.S. PATENT DOCUMENTS

| | | | |
|---|---|---|---|
| 2013/0226671 A1* | 8/2013 | Pechanec | G06Q 10/0633 705/7.36 |
| 2014/0068191 A1* | 3/2014 | Benhase | G06F 12/0806 711/119 |
| 2017/0140006 A1* | 5/2017 | Yang | G06F 17/30864 |
| 2017/0242667 A1* | 8/2017 | Kotman | G06F 8/35 |

* cited by examiner

SYSTEMS AND METHOD FOR SUPPORTING REACTIVE RESPONSES USING A DEPENDENCY INJECTION FRAMEWORK

CLAIM OF PRIORITY

This application claims the benefit of priority to U.S. Provisional Application titled "SYSTEM AND METHOD FOR REACTIVE RESPONSE COMPOSITION USING DEPENDENCY INJECTION FRAMEWORK", Application No. 62/396,154, filed Sep. 17, 2016, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to software development, and are particularly related to a system and method for supporting reactive responses using a dependency injection framework.

BACKGROUND

In a modern server-side enterprise application deployed in a server, request processing often involves interactions with multiple remote backend systems. Typically such interactions happen synchronously, thereby significantly increasing the response time. Because of the synchronous nature of the interactions, precious server-side resources, such as threads, can be blocked, which can affect the overall throughput of the server.

SUMMARY

In accordance with an embodiment, described herein is a system and method for supporting a reactive response using a dependency injection (DI) framework. The DI framework can determine the dependencies of a response object, and invoke a plurality of services for retrieving dependency objects from backend systems to satisfy those dependencies. Each service can return a reactive object, which the DI framework can match to a dependency object, thereby enabling the DI framework to orchestrate asynchronous concurrent calls to the services on behalf of an application. Each reactive object can be used to retrieve a corresponding dependency object at a later time. The DI framework can use the dependency object to compose the response object and inject the response object to an application at the server environment.

DETAILED DESCRIPTION

Figure 1:
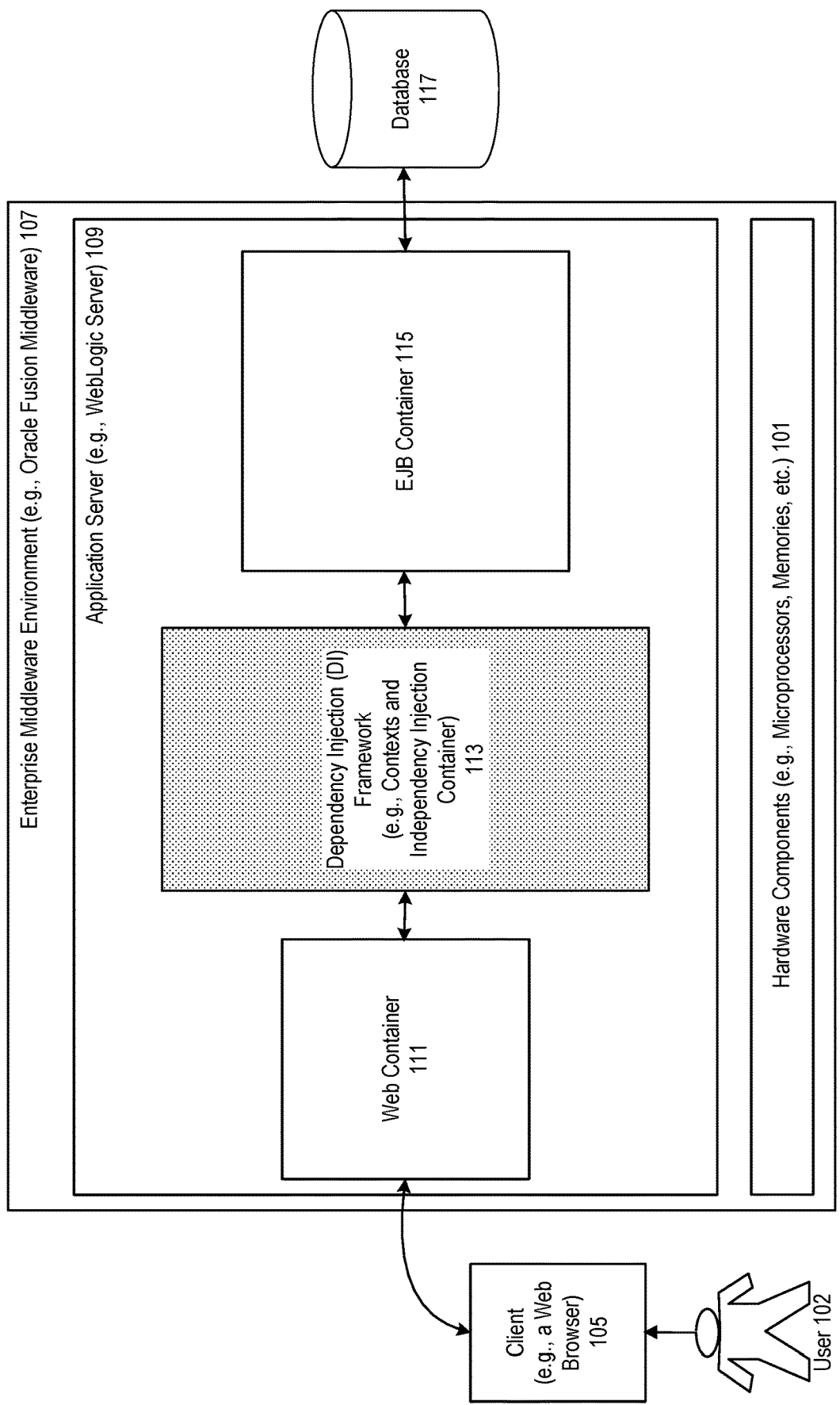
FIG. 1 illustrates an exemplary server environment, in accordance with an embodiment.

As described above, synchronous interactions between a client and multiple backend systems can impact the throughput of a server, when interactions between the client and the backend systems are synchronous in nature.

To address this issue, application developers may use asynchronous programming in their enterprise applications. Reactive libraries, for example, RxJava, Google™ ListenableFuture and Oracle™ CompletableFuture, can be used for asynchronous programming. Other asynchronous programming techniques include using callback methods. However, these reactive libraries and programming techniques may also significantly increase the code complexity of an application.

In accordance with an embodiment, described herein is a system and method for supporting a reactive response using a dependency injection (DI) framework. The DI framework can determine the dependencies of a response object, and invoke a plurality of services for retrieving dependency objects from backend systems to satisfy those dependencies. Each service can return a reactive object, which the DI framework can match to a dependency object, thereby enabling the DI framework to orchestrate asynchronous concurrent calls to the services on behalf of an application. Each reactive object can be used to retrieve a corresponding dependency object at a later time. The DI framework can use the dependency object to compose the response object and inject the response object to an application at the server environment.

In accordance with an embodiment, an error can be thrown if a dependency object is not returned within a specified time limit.

In accordance with an embodiment, the non-blocking nature of the calls to the services allows a single server thread to execute the calls concurrently, thereby improving system throughput. To enable the non-blocking nature of the calls, a return type resolution component can be provided in the DI framework to match a producer of a reactive object configured to return a dependency object at a later time to the dependency, so that the reactive object can be used to satisfy an injection of the dependency object.

For example, the DI framework can match a producer of Future<T> with T to satisfy an injection of type T.

In accordance with an embodiment, to avoid the situation where the DI framework may wait for a dependency object from a backend system that experiences problems, for example, system failures or network issues, an asynchronous qualifier can be provided in the DI framework to qualify the injection point for the dependency object. The asynchronous qualifier can include a timeout attribute, which can be used to configure how long the injection framework should wait for an asynchronous operation to return a result before it raises an error.

In accordance with an embodiment, after all the asynchronous injection points are satisfied in the response object, the DI framework can call bean lifecycle methods, for example, CustomerResponse.init( ) annotated with @PostConstruct, to initialize the response object and inject the response object to the application.

The features described above allow application developers to write reactive applications without the undue code complexity often associated with asynchronous programming using libraries and/or callback methods.

In accordance with an embodiment, the systems and methods described herein can be used in a variety of server environments, including, for example an application server environment.

FIG. 1 illustrates an exemplary server environment, in accordance with an embodiment.

As illustrated in FIG. 1, an application server 109 in an enterprise middleware environment 107, for example, Oracle™ Fusion Middleware, can execute on one or more computer hardware components 101.

In accordance with an embodiment, the application server can be a WebLogic Server, a Glassfish server, a JBoss server, or another type of application server; and can include a web container 111, and a dependency injection (DI) framework 113, an Enterprise JavaBeans (EJB) container 115. A database 117 can store data for use by the application server. A user 102 can interact with the application server via a client 105, for example, a web browser.

As used herein, in accordance with an embodiment, dependency injection (DI) generally refers to the process of supplying one or more external dependencies to a software component. Using DI, a software component can declare its dependency on one or more services, and can have the DI framework 113 to assume the responsibility of locating and/or instantiating the services and supplying the relevant service references to the software component when needed. DI can be used to achieve loose coupling between objects and their dependencies.

In accordance with an embodiment, the DI framework can be a Contexts and Dependency Injection (CDI) framework, which can define a set of services for using injection to specify dependencies in an application, and can provide contextual life cycle management of beans, type-safe injection points, a loosely coupled event framework, and loosely coupled interceptors and decorators.

As used herein, a bean is generally a concrete class that has a constructor with no parameters (or a constructor designated with the annotation @Inject).

In accordance with an embodiment, the DI framework can also provide alternative implementations of beans, bean navigation through the Unified Expression Language (EL), and a service provider interface (SPI) that enables CDI extensions to support third-party frameworks or future Java EE components. The DI framework can be integrated with other component technologies in a server environment.

In accordance with an embodiment, the DI framework can manage the creation of instances of an object, allowing an application to create the instance using a new operator; and can inject the instance into the application in a typesafe way, including determining at deployment time which implementation of a particular interface to inject.

In accordance with an embodiment, a component (i.e., a dependency) can be injected into an object or other component using the @Inject annotation, which can be used to define an injection point that is injected during bean instantiation.

In accordance with an embodiment, dependency injection can be performed when a bean instance is first instantiated by the DI framework/container. First, the DI framework (or DI container) can call the bean constructor (the default constructor or the one annotated @Inject), to obtain an instance of the bean. The DI framework can initialize values of all injected fields of the bean. Next, the DI framework can call all initializer methods of bean. Finally, a method annotated by a PostConstruct annotation, if any, can be called.

In accordance with an embodiment, the PostConstruct annotation can be used on a method that needs to be executed after dependency injection is completed to perform any initialization. This method needs to be invoked before a class is put into service.

In accordance with an embodiment, the dependency injection process can be triggered by a call from an application or an object, to the DI framework for a dependency object to be injected.

For example, in a CDI container implemented on an Oracle™ WebLogic server instance, the dependency injection process can be triggered by "@Inject Provider<T> responseProvider" and then by calling the get method of the "responseProvider". In other JSR-299 compatible DI containers, the dependency injection process can be triggered by "T BeanManager#getReference(Bean<T> type, Qualifier . . . qualifiers).

In accordance with an embodiment, in each of the dependency injection triggering examples described above, an instance of a given type T can be created and returned, together with @Inject-annotated children of the returned instance of type T in a recursive way.

In accordance with an embodiment, the DI framework can provide a "javax.enterprise.inject.Produces" annotation, to annotate a method (i.e., a producer), which can be used to generate an object for injection when the object is not itself a bean, when the concrete type of the object may vary at runtime, or when the object requires a custom initialization that the bean constructor does not perform.

Scopes, Contexts and Singletons

In accordance with an embodiment, each of the DI framework's managed objects is a "singleton", which means that there is exactly one instance of the object in a well-specified context.

In accordance with an embodiment, the lifecycle of instances can be defined by their scopes. For example, a @SessionScoped-annotated object can exist exactly once per session, and can be a "session singleton". When a user accesses the @SessionScoped bean for the first time, the bean can be created and stored inside the session. Every subsequent access can return exactly this same instance. When the session ends, all the instances managed by the DI framework and stored inside the session can be properly destroyed.

Similarly, a @RequestScoped bean can be a "request singleton", and a @ConversationScoped bean can be "conversation singleton".

Qualifiers

In accordance with an embodiment, an application may require multiple implementations of one and the same interface. Each implementation should have different names in a server environment that does not include a DI framework, where the string-based solution is not typesafe and can lead to ClassCastExceptions.

The DI framework can provide a typesafe way to achieve the same result with the @Qualifier meta-annotation.

For example, if an application needs to access two different databases using the Java Persistence API (JPA), and as such needs two different EntityManagers; then to distinguish between the two EntityManagers, two @Qualifier annotations (@CustomerDb and @AdminDb) can be created, to inject an appropriate EntityManager as shown below:

```
public @ApplicationScoped class MyService {
    private @Inject @CustomerDb EntityManager customerEm;
    private @Inject @AdminDb EntityManager adminEm;
    ...
}
```

Figure 2:
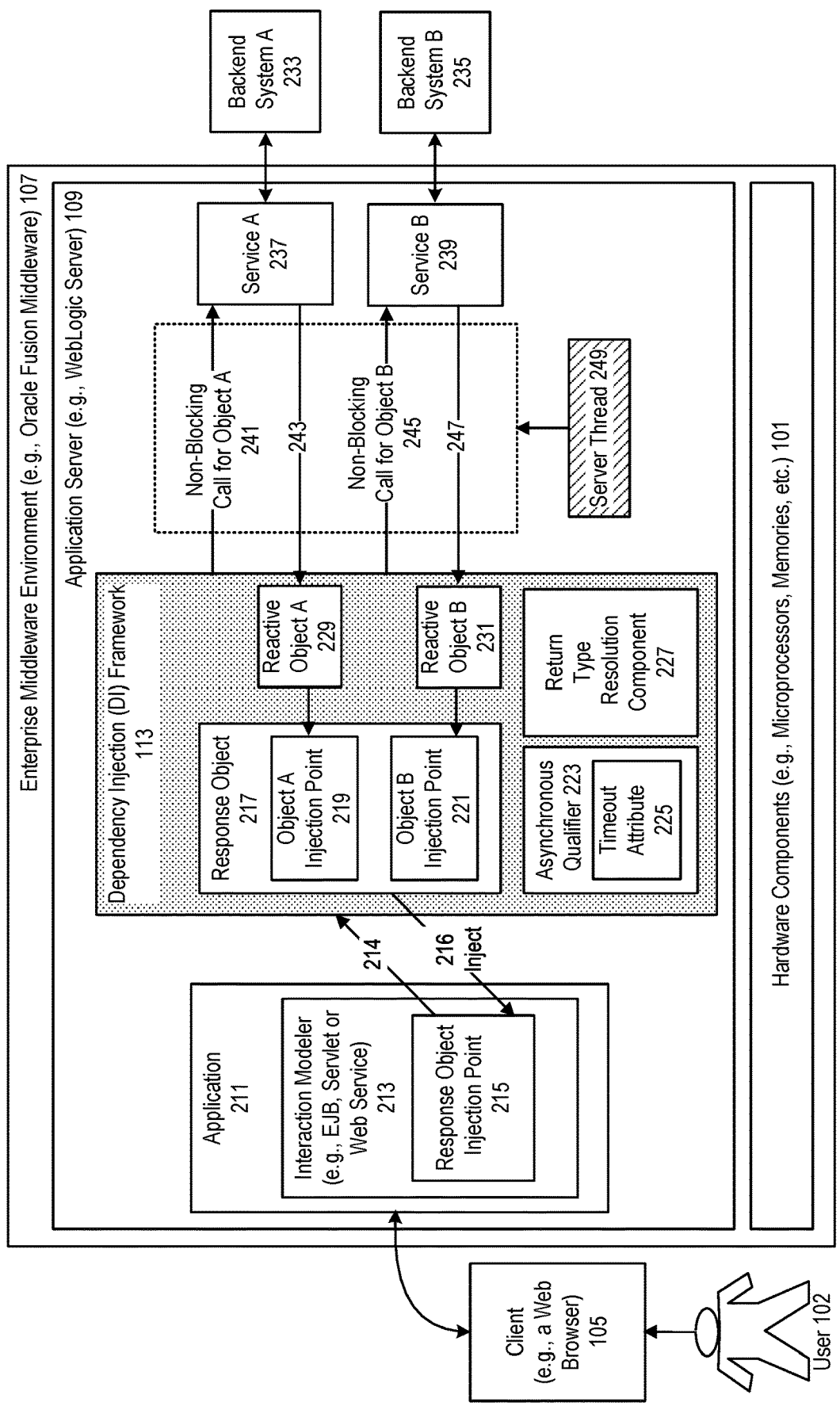
FIG. 2 illustrates a system for composing reactive responses using a dependency injection framework, in accordance with an embodiment.

FIG. 2 illustrates a system for composing reactive responses using a dependency injection framework in a server environment, in accordance with an embodiment.

As illustrated in FIG. 2, an application 211 can execute on the application server 109. In accordance with an embodiment, the application can be a Java application based on Enterprise Java Beans (EJB), Java API for RESTful Web Services (JAX-RS) beans, or Java Servlets.

In accordance with an embodiment, the application can also include an interaction modeler 213, configured to model interactions with a specific logged-in customer, for example, user 102, through a client application 105.

In accordance with an embodiment, the application can define an injection point 215 for a response object, and can trigger 214 a dependency injection process for the response object, by calling a get method of a provider interface implemented by the DI framework.

For example, to trigger a dependency injection process for a CustomResponse object, the following code can be used:

```
@Inject
Provider<Response> responseProvider;
public CustomerResponse getCustomerResponse(String custId) {
    // get( ) will block until Response is composed
    return responseProvider.get( );
}
```

In accordance with an embodiment, the response object 217 can include a plurality of dependency injection points, for example, an object A injection point 219, and an object B injection point 221, to declare a plurality of dependencies of the response object.

Upon receiving a trigger for injecting the response object to the application, the DI framework can recursively determine the dependencies of the response object, and where to obtain the dependencies.

For example, the DI framework can determine that the response object depends on object A and object B, and that service A 237 and service B 239 can be used to obtain the dependency objects respectively from backend system A 233 and backend system B 235.

In accordance with an embodiment, each backend system can be, for example, a database system, another application, or a cloud service. Each of service A and service B can be implemented as a stateless EJB having asynchronous methods.

As an illustrative example, consider an application that is a shopping store application that can expose a method used to return to a logged-in user a response object, which comprises a Customer object containing details about the logged-in customer and a ShoppingCart object containing items added by the logged-in customer. In this example, the Customer object and the ShoppingCart object can be retrieved from different backend systems.

In accordance with an embodiment, a server thread 249 can be dispatched to imitate an asynchronous non-blocking call 241 for object A to service A. While waiting for object A to be populated from backend system A, service A can return 243 reactive object A 229 to the DI framework.

In accordance with an embodiment, a return type resolution component 227 in the DI framework can be used to match a producer of a reactive object A with an object A, thereby allowing the DI framework to satisfy the dependency injection request for object A using the reactive object A, which can return object A at a later time.

In accordance with an embodiment, upon receiving reactive object A, the server thread 249 can be released, and can be dispatched to initiate an asynchronous non-blocking call 245 for object B to service B. While waiting for object B to be populated from backend system B, service B can return 247 reactive object B 231.

Similarly, if the response object 217 includes additional dependencies, the DI framework can use the same server-thread 249 to initiate non-blocking asynchronous calls to services to obtain reactive objects to satisfy the dependencies.

As such, by using non-blocking asynchronous calls to retrieve the plurality of objects from different backend systems, a single server thread, for example, the server thread 153, can be used to initiate multiple concurrent calls, thereby improving system throughput.

In accordance with an embodiment, each of reactive object A and reactive object B can be a Future object, representing a result of the asynchronous computation of populating object A or object B from a database. Methods can be provided in each reactive object to check if the asynchronous computation is completed, to wait for its completion, and to retrieve the result of the computation.

For example, reactive object A can be in the format of Future<object A>, and reactive object B can be in the format of Future<object B>. Each reactive object can include a get method for use in retrieving a corresponding dependency object at a later time when the corresponding dependency object is available, for example, when the corresponding dependency object is populated from a backend system.

In accordance with an embodiment, when object A and object B are populated and returned to the DI framework, the DI framework can call a method (e.g., an initialization method) annotated by a post construct annotation to initialize the response object, and inject the fully initialized response object to the application.

As further shown, the DI framework can include an asynchronous qualifier 223 with a timeout attribute 225 for specifying how long the injection DI framework should wait for an asynchronous operation to return a result before it raises an error.

Figure 3:
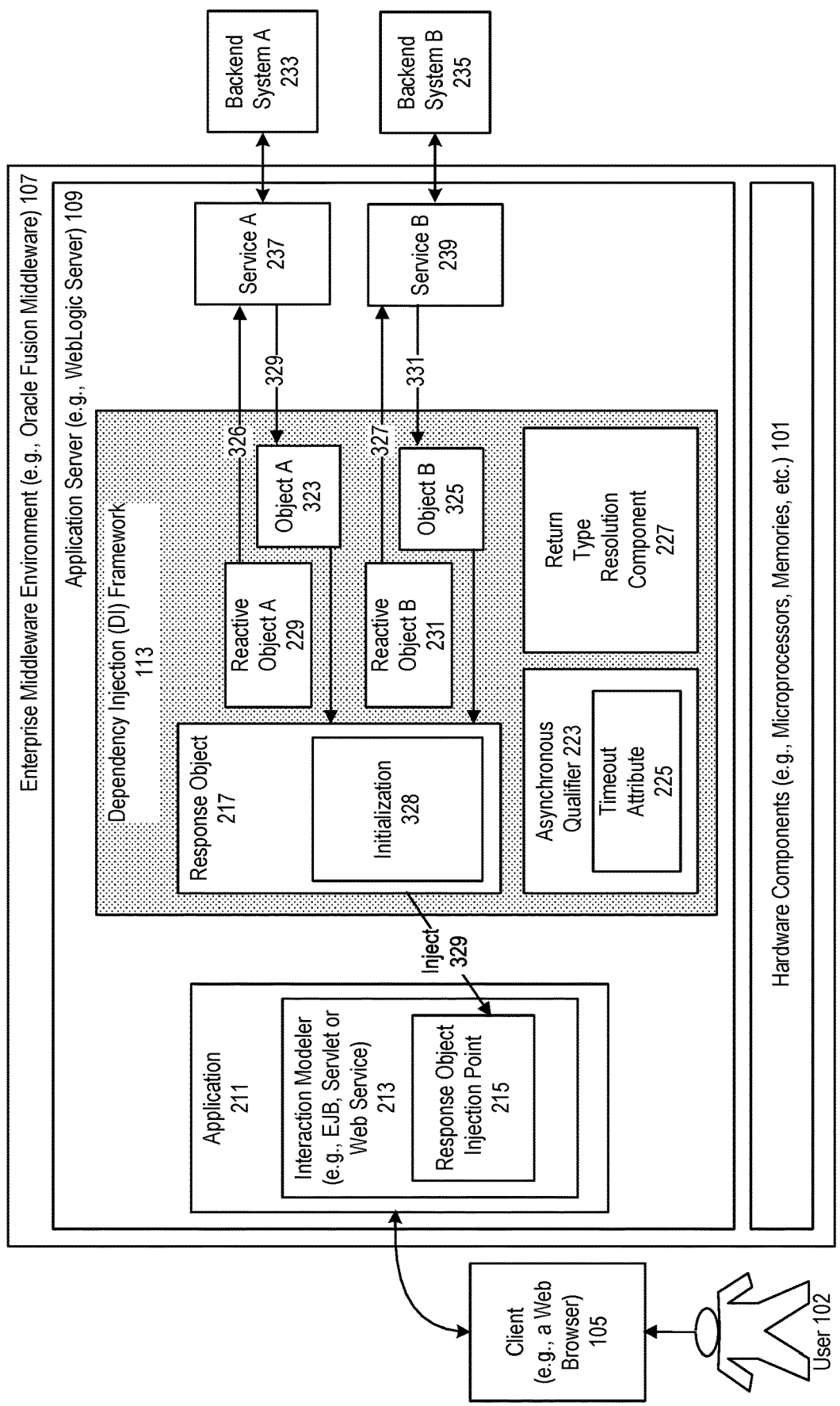
FIG. 3 further illustrates a system for composing reactive responses using a dependency injection framework, in accordance with an embodiment.

FIG. 3 further illustrates a system for composing reactive responses using a dependency injection framework in a server environment, in accordance with an embodiment.

As illustrated in FIG. 3, the server thread 249 described in FIG. 2 has been released after initiating the plurality of concurrent non-blocking asynchronous calls to the plurality of services. Reactive object A 229 and reactive object B 231 have been used by the DI framework to satisfy the injection requirements for object A and object B in the response object.

As illustrated in FIG. 3, in accordance with an embodiment, reactive object A and reactive object B can be used to call 326, 327 service A and service B to obtain 329, 331 object A 323 and object B 325 respectively from service A and service B.

In accordance with an embodiment, object A and object B can be injected into the response object, and can be used to compose the response object for injection to the application.

In accordance with an embodiment, the DI framework can call an initialization method 328 to initialize the composed response object, and inject 329 the response object to the application.

Figure 4:
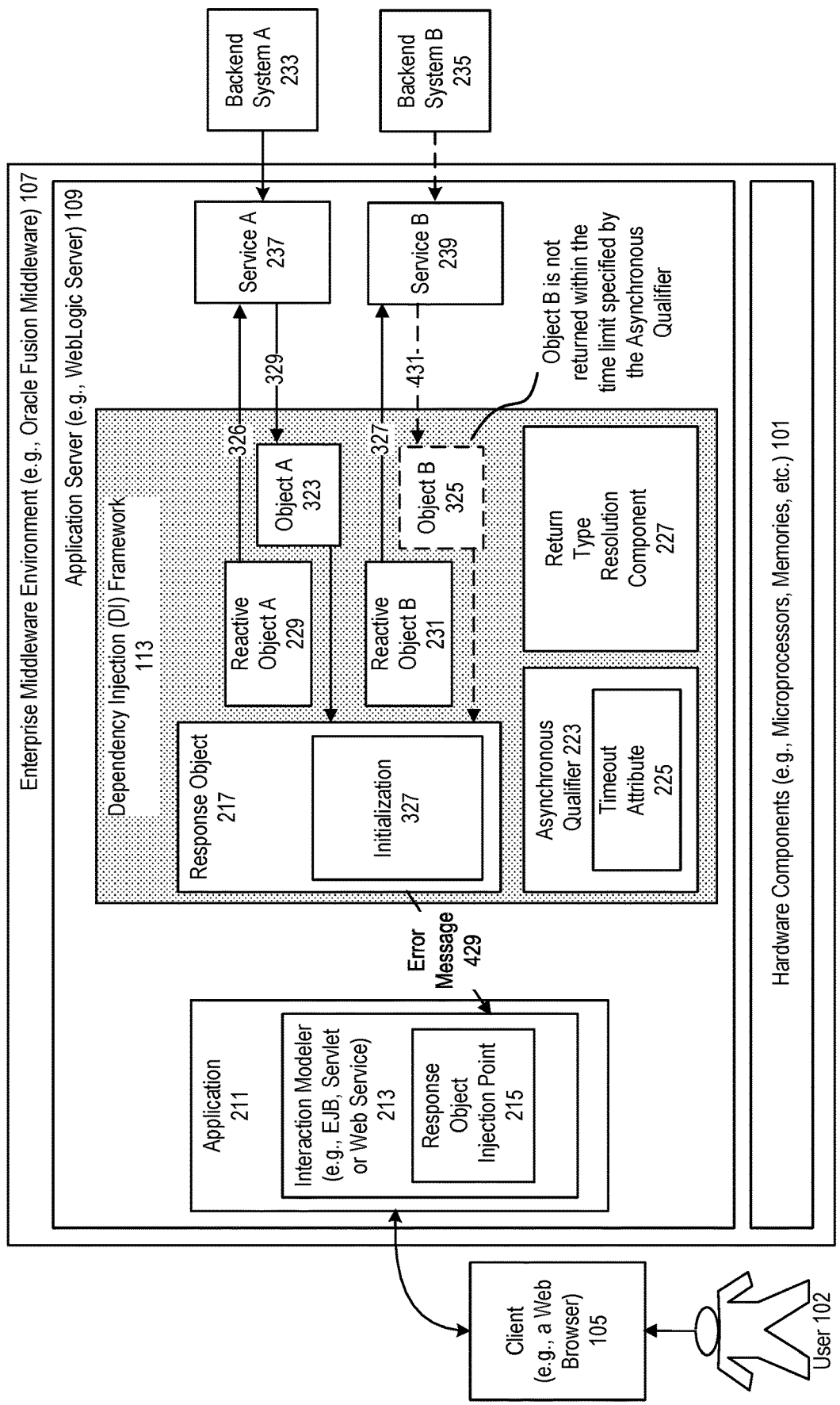
FIG. 4 further illustrates a system for composing reactive responses using a dependency injection framework, in accordance with an embodiment.

FIG. 4 further illustrates a system for composing reactive responses using a dependency injection framework in a server environment, in accordance with an embodiment.

In accordance with an embodiment, if a dependency object, for example, object B 325, is not returned 431 to the DI framework, in response to a call from a reactive object, within a period of time specified by the timeout attribute of the asynchronous qualifier, then an error can be thrown by the DI framework, and can be propagated 429 to the application.

In a situation such as described above, the DI framework may not call the initialization method to initialize the response object, and may not inject the response object to the application. This feature can help avoid the situation where the application has to wait indefinitely for a response object to be injected due, for example, to a system failure or a networking error on a backend system.

Figure 5:
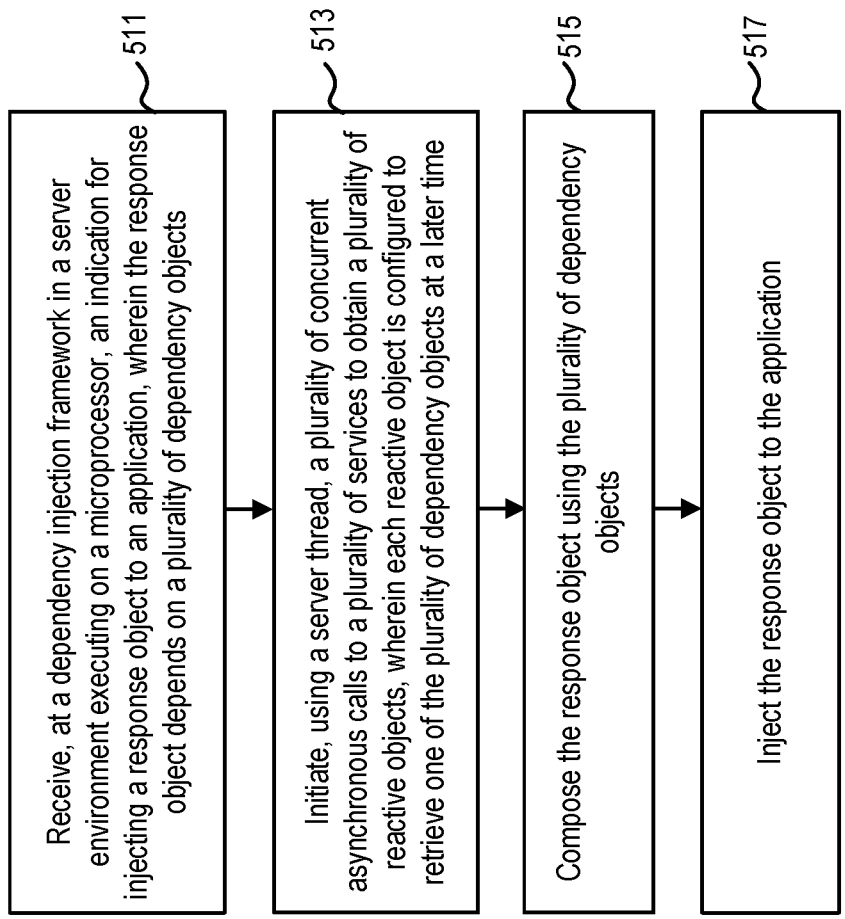
FIG. 5 illustrates a method for composing reactive responses using a dependency injection framework, in accordance with an embodiment.

FIG. 5 illustrates a method for composing reactive responses using a dependency injection framework in a server environment, in accordance with an embodiment.

As illustrated in FIG. 5, at step 511, an indication for injecting a response object to an application is received at a dependency injection framework, in a server environment executing on a microprocessor, wherein the response object depends on a plurality of dependency objects.

At step 513, a plurality of concurrent asynchronous calls are initiated using a server thread to a plurality of services to obtain a plurality of reactive objects, wherein each reactive object is configured to retrieve one of the plurality of dependency objects at a later time.

At step 515, the response object is composed using the plurality of dependency objects.

At step 517, the response object is injected by the dependency injection framework to the application.

Example Implementation

In accordance with various embodiments, several features are illustrated herein using a server side enterprise Java application. Although this application uses EJBs, the concepts are applicable to other component models such as, for example, JAX-RS beans, or Servlets.

In accordance with an embodiment, and by way of an illustrative example, a Shopping Store application can comprise a stateful EJB called StoreBean that models interaction with a specific logged in customer. This bean has a public method called setCustomerId( ) which is called by its client to set the customer id of the logged in user. The bean also exposes another method to return the CustomerResponse object which comprises of two separate objects called Customer containing details about the customer and ShoppingCart containing the items already added by the customer to her cart. These objects are managed by two separate services called CustomerService and ShoppingCartService respectively.

In this example application, those services are implemented as two stateless EJBs having asynchronous business methods. The StoreBean.getCustomerResponse( )method internally invokes these two other EJBs to compose the response.

Example implementations of the application can include: using Java EE injection framework that results in simple non-reactive code; using CompletableFuture that results in complex reactive code; or using the proposed enhancements results in simple yet reactive code.

The following code snippets illustrate how the system and method can improve the reactiveness of the code without sacrificing the simplicity of the code.

Listing 1 illustrates an example use of a Java EE injection framework that results in non-reactive code, in accordance with an embodiment.

Listing 1

```
import javax.annotation.PostConstruct;
import javax.inject.Inject;
import java.util.logging.Logger;
    public class CustomerResponse {
        @Inject
        private Customer customer;
        @Inject
        private ShoppingCart shoppingCart;
        @PostConstruct
        public void init( ) {
            // Lets log the injected values for debugging
            Logger.getAnonymousLogger( ).fine("Customer: " +
getCustomer( ) + ", Cart: " + getShoppingCart( ));
        }
        public Customer getCustomer( ) {
            return customer;
        }
        public ShoppingCart getShoppingCart( ) {
            return shoppingCart;
        }
    }
import javax.ejb.EJB;
import javax.ejb.Stateful;
import javax.enterprise.inject.Produces;
import javax.inject.Inject;
import javax.inject.Provider;
import java.util.concurrent.ExecutionException;
/**
 * This class is stateful EJB that represents a customer's interaction
with the store application.
 *
 *
 */
@Stateful(name = "StoreBeanEJB")
public class StoreBean {
    @EJB
    private CustomerService cs;
    @EJB
    private ShoppingCartService scs;
    String custId;
    // We inject Provider<T> so that we can construct actual instances in
request scope
    @Inject
    Provider<CustomerResponse> responseProvider;
    // Business method exposed by the stateful session bean
    public void setCustomerId(String custId) {
        this.custId = custId;
    }
    // Business method exposed by the stateful session bean
    public CustomerResponse getCustomerResponse( ) {
        return responseProvider.get(); // get() will block until
CustomerResponse is composed
    }
    @Produces
    private Customer getCustomer() throws ExecutionException,
    InterruptedException {
        return cs.getCustomer(custId).get(); // will block
    }
    @Produces
    private ShoppingCart getShoppingCart() throws ExecutionException,
InterruptedException {
        return scs.getShoppingCart(custId).get( ); // will block
    }
}
```

As illustrated in the example shown above, in accordance with an embodiment, when getCustomerResponse( ) is invoked, it results in a creation of a CustomerResponse object synchronously. CustomerResponse object requires an injection of Customer object and ShoppingCart object, which in turn requires synchronous invocations of getCustomer( ) and getShopingCart( ) producer methods respectively. Since both the methods are blocking in nature, it affects the throughput of the system.

Listing 2 illustrates an example that uses a dependency injection framework to compose a reactive response, in accordance with an embodiment.

Listing 2

```
import com.oracle.javax.enterprise.inject.Async;
import javax.annotation.PostConstruct;
import javax.inject.Inject;
import java.util.concurrent.TimeUnit;
import java.util.logging.Logger;
public class CustomerResponse {
    @Inject
    @Async(timeout = 60, unit = TimeUnit.SECONDS)
    private Customer customer;
    @Inject
    @Async(timeout = 120)
    private ShoppingCart shoppingCart;
    @PostConstruct
    public void init( ) {
        // Lets log the injected values for debugging
        Logger.getAnonymousLogger( ).fine("Customer: " +
getCustomer( ) + ", Cart: " + getShoppingCart( ));
    }
    public Customer getCustomer( ) {
        return customer;
    }
    public ShoppingCart getShoppingCart( ) {
        return shoppingCart;
    }
}
import javax.ejb.EJB;
import javax.ejb.Stateful;
import javax.enterprise.inject.Produces;
import javax.inject.Inject;
import javax.inject.Provider;
import java.util.concurrent.Future;
/**
 * This class is stateful EJB that represents a customer's interaction
with the store application.
 *
 */
@Stateful(name = "StoreBeanEJB")
public class StoreBean {
    @EJB
    private CustomerService cs;
    @EJB
    private ShoppingCartService scs;
    String custId;
    // We inject Provider<T> so that we can construct actual instances in
request scope
    @Inject
    Provider<CustomerResponse> responseProvider;
    // Business method exposed by the stateful session bean
    public void setCustomerId(String custId) {
        this.custId = custId;
    }
    // Business method exposed by the stateful session bean
    public CustomerResponse getCustomerResponse( ) {
        return responseProvider.get( ); // get( ) will block until
CustomerResponse is composed
    }
    @Produces
    private Future<Customer> getCustomer( ) {
        return cs.getCustomer(custId);
    }
    @Produces
    private Future<ShoppingCart> getShoppingCart( ) {
        return scs.getShoppingCart(custId);
    }
}
```

A comparison of the above examples illustrates that the producer methods such as getCustomer( ) and getShopingCart( ) return Future<Customer> and Future<ShoppingCart> respectively. Thus they are non-blocking in nature.

An additional difference between the example code in Listing 1 and Listing 2 is the use of a com.oracle.javax.enterprise.inject.Async annotation in CustomerRepsonse.

In accordance with an embodiment, the dependency injection (DI) system (for example, in the Java EE platform, Context Dependency Injection (CDI)) can asynchronously perform injections of injection points that are qualified with the @Async qualifier. The DI system can also be modified to match a producer of Future<T> to satisfy an injection of type T.

An example code for @Async is provided below in Listing 3.

In accordance with an embodiment, using the timeout attributes of the @Async annotation, a programmer can configure how long the injection framework should wait for an asynchronous operation to return a result before it raises an error. After all the asynchronous injection points are satisfied, the injection framework calls bean lifecycle methods such as CustomerResponse.init( ) which is annotated with @PostConstruct in example shown Listing 2.

In the example provided below, using the timeout attributes of the @Async annotation, programmer can configure how long the injection framework should wait for an asynchronous operation to return a result before it raises an error. After all the asynchronous injection points are satisfied, the injection framework calls bean lifecycle methods such as CustomerResponse.init( ) which is annotated with @PostConstruct in Listing 2.

Listing 3

```
package com.oracle.javax.enterprise.inject;
import javax.inject.Qualifier;
import java.lang.annotation.Retention;
import java.lang.annotation.RetentionPolicy;
import java.util.concurrent.TimeUnit;
/**
 * A qualifier to be used at injection point to request an injection to be
performed asynchronously by the DI system.
 * <p>
 * Upon timeout, the thread used by the DI system to satisfy the
injection point gets interrupted and will throw a RuntimeException
causing the injection to fail.
 *
 */
@Retention(RetentionPolicy.RUNTIME)
@Qualifier
public @interface Async {
    int timeout( ) default 60;
    TimeUnit unit( ) default TimeUnit.SECONDS;
}
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, while several of the embodiments and examples described herein illustrate the use of EJBs, the features described herein can be used with other component models, for example JAX-RS beans, or Servlets. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for reactive response composition in an enterprise middleware environment, comprising:
   a computer including a microprocessor;
   a server environment executing on the microprocessor, wherein the server environment includes a dependency injection framework;
   wherein the dependency injection framework is configured to
      receive, from an application, a method call to a method of the dependency injection framework, wherein the method call instantiates a response object, wherein the response object requires, for composition, a plurality of dependency objects, and wherein the plurality of dependency objects require, for composition, data from a respective plurality of back-end systems,
      initiate, using a server thread, a plurality of concurrent asynchronous calls to a plurality of services to obtain a plurality of reactive objects, wherein each reactive object is configured to retrieve the data required for composition of a respective one of the plurality of dependency objects and to populate the respective one of the dependency objects with the retrieved data required for composition,
      compose the response object using the plurality of dependency objects, and
      inject the response object to the application.

2. The system of claim 1, wherein the plurality of concurrent asynchronous calls are non-blocking calls.

3. The system of claim 1, wherein each of the reactive objects is a Future object.

4. The system of claim 1, wherein the dependency injection framework includes an asynchronous qualifier with a timeout attribute for specifying a period of time that the dependency injection framework should wait for one of the plurality of services to return a result before raising an error.

5. The system of claim 1, wherein each reactive object includes a method configuring the reactive object to wait while the respective one of the dependency objects is populated.

6. The system of claim 1, wherein the respective plurality of back-end systems comprise one of a database, or a web service.

7. The system of claim 1, wherein in the server environment includes an application server, and one or more of EJB, JAX-RS beans, or Servlets.

8. A method for reactive response composition using a dependency injection framework, comprising:
   receiving, at a dependency injection framework in a server environment executing on a microprocessor, a method call to a method of the dependency injection framework, wherein the method call instantiates a response object, wherein the response object requires, for composition, a plurality of dependency objects, and wherein the plurality of dependency objects require, for composition, data from a respective plurality of back-end systems;
   initiating, using a server thread, a plurality of concurrent asynchronous calls to a plurality of services to obtain a plurality of reactive objects, wherein each reactive object is configured to retrieve the data required for composition of a respective one of the plurality of dependency objects and to populate the respective one of the dependency objects with the retrieved data required for composition;
   composing the response object using the plurality of dependency objects; and
   injecting the response object to the application.

9. The method of claim 8, wherein the plurality of concurrent asynchronous calls are non-blocking calls.

10. The method of claim 8, wherein each of the reactive objects is a Future object.

11. The method of claim 8, wherein the dependency injection framework includes an asynchronous qualifier with a timeout attribute for specifying a period of time that the dependency injection framework should wait for one of the plurality of services to return a result before raising an error.

12. The method of claim 8, wherein each reactive object includes a method configuring the reactive object to wait while the respective one of the dependency objects is populated.

13. The method of claim 8, wherein the respective plurality of back-end systems comprise one of a database, or a web service.

14. The method of claim 8, wherein in the server environment includes an application server, and one or more of EJB, JAX-RS beans, or Servlets.

15. A non-transitory computer readable storage medium, including instructions stored thereon which when read and executed by one or more computers cause the one or more computers to perform the method comprising:
   receiving, at a dependency injection framework in a server environment executing on a microprocessor, a method call to a method of the dependency injection framework, wherein the method call instantiates a response object, wherein the response object requires, for composition, a plurality of dependency objects, and wherein the plurality of dependency objects require, for composition, data from a respective plurality of back-end systems;
   initiating, using a server thread, a plurality of concurrent asynchronous calls to a plurality of services to obtain a plurality of reactive objects, wherein each reactive object is configured to retrieve the data required for composition of a respective one of the plurality of dependency objects and to populate the respective one of the dependency objects with the retrieved data required for composition;

composing the response object using the plurality of dependency objects; and injecting the response object to the application.

16. The non-transitory computer readable storage medium of claim 15, wherein the plurality of concurrent asynchronous calls are non-blocking calls.

17. The non-transitory computer readable storage medium of claim 15, wherein each of the reactive objects is a Future object.

18. The non-transitory computer readable storage medium of claim 15, wherein the dependency injection framework includes an asynchronous qualifier with a timeout attribute for specifying a period of time that the dependency injection framework should wait for one of the plurality of services to return a result before raising an error.

19. The non-transitory computer readable storage medium of claim 15, wherein each reactive object includes a method configuring the reactive object to wait while the respective one of the dependency objects is populated.

20. The non-transitory computer readable storage medium of claim 15, wherein the respective plurality of back-end systems comprise one of a database, or a web service.

* * * * *

UNITED STATES PATENT AND TRADEMARK OFFICE
CERTIFICATE OF CORRECTION

| | | |
|---|---|---|
| PATENT NO. | : 10,613,834 B2 | Page 1 of 1 |
| APPLICATION NO. | : 15/433661 | |
| DATED | : April 7, 2020 | |
| INVENTOR(S) | : Sahoo et al. | |

It is certified that error appears in the above-identified patent and that said Letters Patent is hereby corrected as shown below:

On the Title Page

Item (54) Title and in the Specification, in Column 1, Line 1, delete "SYSTEMS" and insert -- SYSTEM --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*